US006670572B2

(12) United States Patent
Norris et al.

(10) Patent No.: US 6,670,572 B2
(45) Date of Patent: Dec. 30, 2003

(54) SOLENOID CONTROL AND SAFETY CIRCUIT SYSTEM AND METHOD

(75) Inventors: Stephen W. Norris, New London, NH (US); David A. Tatham, Enfield, NH (US); Roger W. Hewett, Plainfield, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 13 days.

(21) Appl. No.: 10/090,212

(22) Filed: Mar. 4, 2002

(65) Prior Publication Data

US 2003/0164359 A1 Sep. 4, 2003

(51) Int. Cl.[7] ............................................. B23K 10/00

(52) U.S. Cl. ........................... 219/121.57; 219/121.54; 219/121.55; 219/121.59

(58) Field of Search ....................... 219/121.57, 121.54, 219/121.55, 121.56, 121.59, 121.48, 121.5, 121.52, 75

(56) References Cited

U.S. PATENT DOCUMENTS 4,585,921 A * 4/1986 Wilkins et al. ........ 219/121.55
5,844,197 A * 12/1998 Daniel .................. 219/121.54
5,961,855 A * 10/1999 Hewett et al. ......... 219/121.57
6,133,543 A * 10/2000 Borowy et al. ........ 219/121.57

* cited by examiner

*Primary Examiner*—Mark Paschall
(74) *Attorney, Agent, or Firm*—Harness, Dickey & Pierce, P.L.C.

(57) ABSTRACT

A solenoid control and safety circuit suitable for use in connection with contact start, plasma-arc torches. The system monitors a voltage to determine when to open an air control solenoid as part of a contact starting process. If a proper voltage is sensed, a gas solenoid is opened to allow airflow to separate the contact starting elements. The system also includes a circuit that monitors a gas pressure switch to determine whether sufficient pressure exists to separate the contact start elements after a contact start process has been initiated. The circuit removes power if it senses insufficient pressure. Also disclosed is a circuit that monitors a differential voltage between the electrode and the tip to determine if the elements remain in contact after airflow has been provided to the torch head.

33 Claims, 10 Drawing Sheets

500

600

700

SOLENOID CONTROL AND SAFETY CIRCUIT SYSTEM AND METHOD

BACKGROUND OF THE INVENTION

The invention relates generally to plasma-arc torch systems and power supplies. In particular, the invention relates to systems, circuits, and methods for controlling contact starting and operating plasma-arc torches, including controlling a gas control solenoid, a power supply, and contact start elements.

Plasma-arc torches, also known as electric arc torches, are commonly used for cutting, welding, and spray bonding workpieces. Such torches typically operate by directing a plasma consisting of ionized gas particles toward a workpiece. An example of a conventional gas plasma-arc torch is disclosed in U.S. Pat. No. 3,813,510, the entire disclosure of which is incorporated herein by reference.

In general, a pressurized gas to be ionized is supplied to the front end of the torch (also referred to as the torch head) and flows past an electrode before exiting through an orifice in a torch tip. The electrode has a relatively negative potential and operates as a cathode. The torch tip, which is adjacent the electrode at the front end of the torch, constitutes a relatively positive potential anode. When a sufficiently high magnitude voltage is applied to the electrode, an arc is established across the gap between the electrode and the torch tip, thereby heating the gas and causing it to ionize. The ionized gas in the gap is blown out of the torch and appears as a flame extending externally from the tip. The arc so established is commonly referred to as a pilot arc. A typical pilot arc circuit may provide, for example, 5–50 amps, at 100–200 volts across the electrode to tip gap.

Plasma-arc torches may be found in both "non-contact start" and "contact start" varieties. In non-contact start torches, the tip and electrode are normally maintained at a fixed physical separation in the torch head. Typically, a high voltage high frequency signal (HVHF) is applied to the electrode (relative to the tip) to establish a pilot arc between the electrode and the tip. This may be referred to as HF starting. HF starting generally requires additional circuitry that can cause undesirable electromagnetic interference (EMI) conditions. Regardless of how a pilot arc is established, when the torch head is moved toward the workpiece, the arc transfers to the workpiece-assuming a conductive (e.g., metal) workpiece that is connected to the positive return.

In a typical contact start torch, the tip and/or electrode make electrical contact with each other (e.g., along a longitudinal axis of the electrode). For example, a spring or other mechanical means may be used to bias the tip and/or electrode such that the tip and electrode are normally in electrical contact when gas is not flowing. When the operator squeezes the torch trigger (also referred to as a torch activation switch), a voltage is applied to the electrode and pressurized gas (the plasma gas and/or a secondary gas) flows. The gas causes the tip and electrode to overcome the bias and physically separate. As the tip and electrode separate, a pilot arc is established therebetween.

There are several ways, mechanically speaking, to create the electrical contact necessary to employ a contact starting process. For example, a fixed electrode and translatable tip configuration is possible. In such a configuration, a spring or other means biases the tip into contact with the electrode. When a gas control solenoid opens and supplies plasma and/or secondary gas, the gas flow overcomes the bias force and separates the tip from the electrode, thereby establishing a pilot arc. This configuration is typically referred to as a blow forward contact start torch. Another example involves a fixed tip and translatable electrode that is biased into electrical contact with the tip. In such a configuration, the flow of plasma and/or secondary gas overcomes the bias and separates the electrode from the tip to establish the pilot arc. This configuration is typically referred to as a blow back contact start torch. Both of these exemplary configurations may be referred to as blow apart torches because they employ gas pressure to separate the tip and electrode during the contact start process. Mechanical and/or electromechanical contact starting means are also possible.

Commonly owned U.S. patent application Ser. No. Ser. No. 09/724984, filed Nov. 28, 2000, the entire disclosure of which is incorporated herein by reference, describes contact start torch operations in the context of a circuit and method for ensuring that the parts of a contact start plasma-arc torch are properly in place before allowing the output voltage to ramp up to its final value. Commonly owned U.S. Pat. No. 5,961,855, the entire disclosure of which is incorporated herein by reference, describes a contact start torch in context of a low-voltage source for conducting a parts-in-place check.

In order to use a plasma-arc torch with a workpiece, a main or cutting arc must normally be established between the electrode and the workpiece. As the torch head or front end is brought toward the workpiece, the arc transfers between the electrode and the workpiece because the impedance of the workpiece to negative is typically lower than the impedance of the torch tip to negative. During this "transferred arc" operation, the workpiece serves as the anode.

Once the arc transfer is sensed, it is generally preferred to cease current flow between the electrode and the tip. One method of terminating current flow between the electrode and the tip is to open circuit the pilot arc current path. This may be accomplished by sensing the presence of a current flowing in the workpiece and open circuiting a switch between the tip and ground (positive return). Commonly owned U.S. Pat. Nos. 5,170,030, and 5,530,220, the entire disclosures of which are incorporated herein by reference, describe an arc transfer process.

After arc transfer occurs, the output current is typically increased to a higher, cutting level. The power supply preferably is current controlled so that the cutting current is maintained at or near a constant current level. If the transferred arc is stretched beyond the capacity of the power supply it can extinguish. The arc may stretch, for example, when cutting a discontinuous workpiece (e.g., a metal grate), when cutting near the end of a workpiece, or when the torch is moved away from the workpiece. Once the arc has been extinguished, the torch starting process must typically be repeated. As can be appreciated, it is often desirable to restart the torch as quickly as possible. Commonly owned U.S. patent application Ser. No. 09/870,272, filed May 30, 2001, the entire disclosure of which is incorporated herein by reference, describes systems and methods for re-attaching the pilot arc before the transferred arc completely extinguishes, thereby reducing the likelihood of having to restart the torch.

In plasma arc torch systems employing HF starting, plasma and/or secondary gasses are usually turned on and allowed to run for a brief time before striking an arc. This allows the flow to reach a maximum level before the pilot arc is ignited. A gas pressure switch may be positioned between a gas control solenoid and the torch head to prevent pilot arc ignition until sufficient pressure is sensed, thereby ensuring the availability of plasma gas and that the solenoid properly opened. In prior art contact start torch systems, however, where gas pressure may be necessary to separate the tip and electrode, the gas control solenoid is normally opened at substantially the same time that a DC voltage is applied to the tip and electrode in the starting process. Accordingly, the pressure switch arrangement employed in HF starting systems does not provide an indication that the solenoid has operated properly (and allowed gas flow) before voltage is applied to the torch parts.

FIG. 1 illustrates a prior art contact start process. In particular, FIG. 1 illustrates the contact start process associated with a prior art blow apart torch. Blocks 102–112 reflect the contact start process up to the point at which the electrode and tip make contact with power applied. Thereafter, at block 114, a time delay accounts for the expected worst-case time for the electrode and tip to make contact in a blow apart torch. Blocks 116–126 generally reflect normal torch operations after a pilot arc is established during the contact start process.

As can be appreciated, the prior art time delay safety margin approach (block 114) is less than optimal and will slow down operation of a torch that is capable of restarting faster than the predefined worst-case time. For example, if an operator pulls the torch trigger, a burst of air separates the parts. If the operator thereafter releases the trigger (e.g., because an arc was not established or for other reasons) it takes a finite amount of time for the air pressure to dissipate and allow the parts to come back into contact. If the operator pulls the trigger before the parts come together, the system will fail to arc (there was no contact to execute the contact start process). In prior art systems, it may require more than one second for a fifty foot hose to bleed sufficient air to allow the parts to come back into contact. Thus, such systems require a delay of about 1.5 seconds or more to account for this delay. Such a delay is inefficient in torch systems exhibiting a shorter dissipation time (e.g., because of a shorter hose). Similarly, if a particular torch requires more time than the expected worst case time, such prior art systems may prevent that torch from restarting at all because they would allow the torch operator to initiate a start process before the parts return into contact.

It is also known that a failure of the gas control solenoid can prevent the flow of gas. For example, if the gas control solenoid fails to allow gas flow to the torch during the starting process (e.g., because of a component failure of an obstruction in the solenoid), DC voltage may be applied to both the tip and electrode. These elements, however, will not separate if air flow is required to blow the components apart. In some prior art systems, this voltage can exceed −48 VDC (plasma arc torch systems generally operate on a negative voltage basis; the voltage applied at the electrode is negative and the positive power supply output is connected to ground). This can occur in prior art torch systems that employ a pilot resistor (e.g., 1 ohm) between the tip and the positive ground. Further, the tip may be exposed so that the voltage applied to it is likewise exposed.

Another possible problem in blow forward torches can occur during transferred arc operations. If the torch tip is pushed into contact with the workpiece with sufficient force to overcome the gas pressure that normally keeps the tip and electrode separated (i.e., the tip is forced into contact with the electrode) the arc could extinguish but current would continue to flow.

For these reasons, an improved contact start plasma-arc torch system is desired. Such an improved plasma-arc torch system benefits from an improved solenoid control circuit and method that improves the efficiency of the contact start process. Also, a torch system is desired that provides benefits from an improved circuit and method for ensuring that the contact start elements separate as expected upon the presence of flowing gas. Such an improved system allows greater efficiency, for example, by improving reliability and restart capabilities.

SUMMARY OF THE INVENTION

The invention meets the above needs and overcomes the deficiencies of the prior art by providing an improved contact start plasma-arc torch system and method. In one aspect, the invention relates to a method of operating a contact-start plasma arc torch system. The torch system includes a torch activation switch indicating desired operational states of the torch, a power supply having first and second output terminals and selectively supplying an output voltage therebetween, a plurality of contact start elements, with a first one of the plurality of contact start elements being in selective electrical communication with the first output terminal, and with a second one of the plurality of contact start elements being in selective electrical communication with the second output terminal. The method includes monitoring the torch activation switch and determining if the desired operational state of the torch transitions from an off state to an operating state. The method also includes causing a condition allowing a closed electrical circuit to be established between the plurality of contact start elements. The method further includes sensing a closed electrical circuit condition between the plurality of contact start elements. The method also includes opening a gas control switch and providing a flowing gas to be ionized upon sensing the closed electrical circuit condition between the plurality of contact start elements. The method further includes sensing an open electrical circuit condition between the plurality of contact start elements after opening the gas control switch, closing the gas control switch and removing the flowing gas if the open electrical circuit condition is sensed between the plurality of contact start elements after the flowing gas has been provided.

In another aspect, the invention relates to a method of operating a contact-start plasma arc torch system. The torch system includes a torch actuation switch indicating desired operational states of the torch, a power supply having first and second output terminals and selectively supplying an output voltage therebetween, a plurality of contact start elements, with a first one of the plurality of contact start elements being in selective electrical communication with the first output terminal, and with a second one of the plurality of contact start elements being in selective electrical communication with the second output terminal. The method includes monitoring the torch activation switch and determining if the desired operational state of the torch transitions from an off state to an operating state. The method further includes closing a gas control switch to allow the plurality of contact start elements to form a closed electrical circuit between said plurality of contact start elements. The method also includes monitoring the output voltage and comparing the output voltage to a low voltage threshold. The method further includes opening the gas control switch and providing a flowing gas to be ionized if the output voltage is less than the low voltage threshold. The method also includes comparing the output voltage to a high voltage threshold after opening the gas control switch and thereafter closing the gas control switch and removing the flowing gas if the output voltage is greater than the high voltage threshold.

In still another aspect, the invention relates to a method of operating a contact-start plasma arc torch system. Such a torch system includes a torch activation switch having a first state and a second state, a power supply responsive to the state of the torch actuation switch and selectively providing an output voltage, and a solenoid selectively allowing a gas to be ionized to flow into the torch. The method includes determining the state of the torch actuation switch; determining a value indicative of the output voltage; determining the position of the solenoid; opening the solenoid if the torch actuation switch is in the second state and the solenoid is closed; and closing the solenoid if the torch actuation switch is in the second state and the solenoid is open and the output voltage is greater than an open circuit threshold.

In yet another aspect, the invention relates to a contact start plasma-arc torch system for use by a torch operator in connection with a workpiece. The torch system includes a power source for selectively providing an output voltage. The output voltage transitions from a first value to a second value when a contact start operation is initiated. A torch head includes an electrode and a tip. The electrode is positioned in a circuit path with the power source and receives the output voltage. The tip is adjacent the electrode. The system also includes a source of gas to be ionized, a gas supply line, and a gas control solenoid associated with the gas supply line. The gas control solenoid is positioned between the source of gas and the torch head and selectively allows gas from the source of gas to flow into the torch head via the gas supply line. A gas monitor circuit provides a gas pressure signal having a parameter indicative of a gas pressure in the gas supply line at a point between the gas control solenoid and the torch head. A control circuit monitors the output voltage and the gas pressure signal. Te control circuit sets a time delay period when the output voltage transitions from the first value to the second value and causes the output voltage to reset from the second value to a third value if after the time delay period the gas pressure signal is less than a gas threshold.

In still another aspect, the invention relates to a contact start plasma-arc torch system for use by a torch operator in connection with a workpiece. The torch system includes a power source for selectively providing an output voltage. The torch system also includes a torch head including an electrode and a tip. The electrode is positioned in a circuit path with the power source and receives the output voltage. The tip is adjacent the electrode. The torch system further includes a source of gas to be ionized, a gas supply line, and a gas control solenoid associated with the gas supply line. The gas control solenoid is positioned between the source of gas and the torch head and selectively allows gas from the source of gas to flow into the torch head via the gas supply line. A gas monitor circuit provides a gas pressure signal having a parameter indicative of a gas pressure in the gas supply line at a point between the gas control solenoid and the torch head. A control circuit monitors a differential voltage selectively established between the electrode and the tip. The differential voltage transitions from a first value to a second value when a contact start operation is initiated. The control circuit also monitors the gas pressure signal. The control circuit sets a time delay period when the differential voltage transitions from the first value to the second value and causes the power source to remove the output voltage from the electrode if after the time delay period the gas pressure signal is less than a gas pressure threshold.

In another aspect, the invention relates to a contact start plasma-arc torch for use by a torch operator in connection with a workpiece. The torch system includes a power source for selectively providing an output voltage that transitions from a first value to a second value when a contact start operation is initiated by the torch operator. A torch head includes an electrode and a tip. The electrode is positioned in a circuit path with the power source and receives the output voltage. The tip is adjacent the electrode. A control circuit monitors a differential voltage between the electrode and the tip. The control circuit causes the output voltage of the power source to transition to a third value if the differential voltage between the electrode and the tip remains less than a contact start threshold after a time period sufficient to allow the contact start operation to complete has elapsed.

In yet another aspect, the invention relates to a power supply suitable for use in connection with a contact start plasma-arc torch system. Such a torch system includes a torch head, a source of gas to be ionized, a gas supply line supplying gas to the torch head, and a gas control switch associated with the gas supply line. The gas control switch is positioned between the source of gas and the torch head and selectively allows gas from the source of gas to flow into the torch head via the gas supply line. A gas pressure switch provides a gas pressure signal indicative of a gas pressure in the gas supply line at a point between the gas control solenoid and the torch head. The power supply includes a power source for selectively providing an output voltage to the torch head. The output voltage transitions from a first value to a second value when a contact start operation is initiated. A control circuit monitors the output voltage and the gas pressure signal. The control circuit sets a time delay period when the output voltage transitions from the first value to the second value and causes the output voltage to reset from the second value to a third value if after the time delay period the gas pressure signal is less than a gas pressure threshold.

In still another aspect, the invention relates to a power supply suitable for use in connection with a contact start plasma-arc torch system. The torch system includes a torch head having an electrode and a tip, a source of gas to be ionized, a gas supply line supplying gas to the torch head, and a gas control switch associated with the gas supply line. The gas control switch is positioned between the source of gas and the torch head and selectively allows gas from the source of gas to flow into the torch head via the gas supply line. A gas pressure switch provides a gas pressure signal indicative of a gas pressure in the gas supply line at a point between the gas control solenoid and the torch head. The power supply includes a power source for selectively providing an output voltage to the electrode. The output voltage transitions from a first value to a second value when a contact start operation is initiated. A control circuit monitors a differential voltage selectively established between the electrode and the tip. The differential voltage transitions from a first value to a second value when the contact start operation is initiated. The control circuit also monitors the gas pressure signal. The control circuit sets a time delay period when the differential voltage transitions from the first value to the second value and causes the power source to remove the output voltage from the electrode if after the time delay period the gas pressure signal is less than a gas pressure threshold.

In another aspect, the invention relates to a power supply suitable for use in connection with a contact start plasma-arc torch system. The torch system includes a torch head having an electrode and a tip, a source of gas to be ionized, a gas supply line supplying gas to the torch head, and a gas control switch associated with the gas supply line. The gas control switch is positioned between the source of gas and the torch head and selectively allows gas from the source of gas to flow into the torch head via the gas supply line. The power supply includes a power source for selectively providing an output voltage to the electrode. The output voltage transitions from a first value to a second value when a contact start operation is initiated. A control circuit monitors a differential voltage between the electrode and the tip. The control circuit causes the output voltage of the power source to transition to a third value if the differential voltage between the electrode and the tip remains less than a contact start threshold after a time period sufficient to allow the contact start operation to complete has elapsed.

Alternatively, the invention may comprise various other methods, circuits, and systems.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
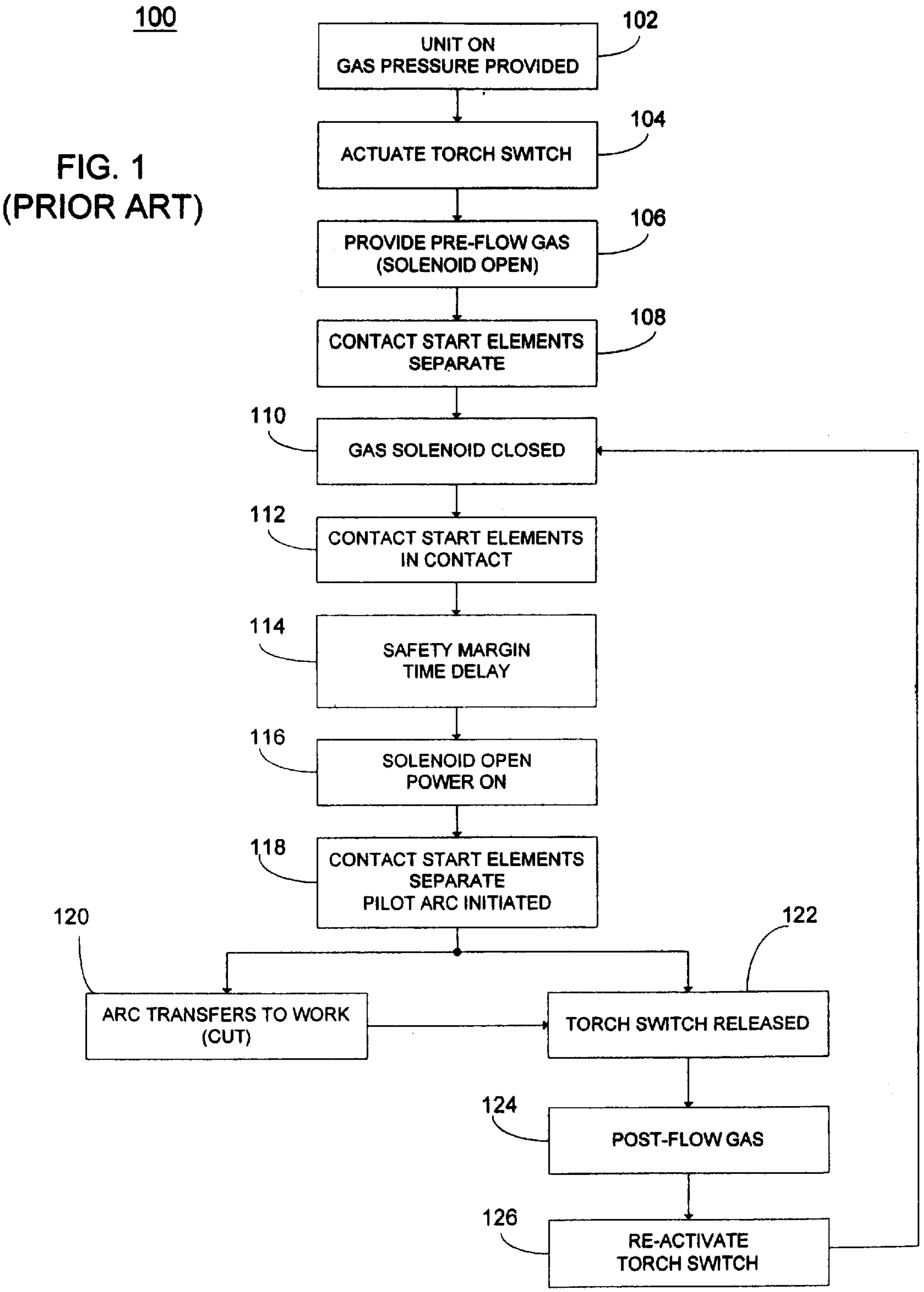
FIG. 1 (PRIOR ART)
FIG. 1 is a flow chart that illustrates a prior art method of controlling a gas solenoid to ensure sufficient time to allow a contact start process to initiate.
Figure 2:
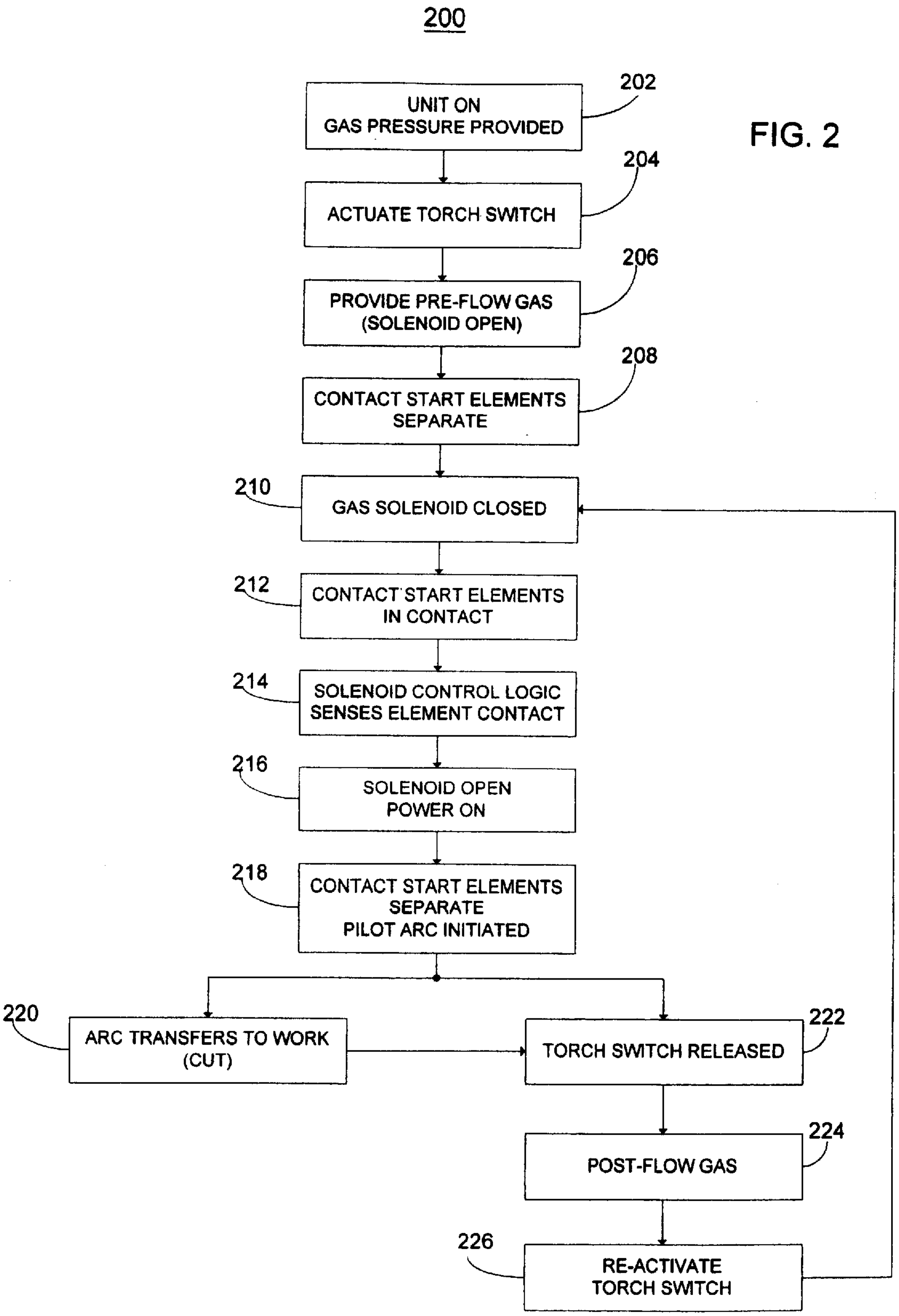
FIG. 2 is a flow chart of an improved method of controlling a gas solenoid during a contact start process, in accordance with aspects of the present invention.

FIG. 2 is a flow chart illustrating aspects of a method 200 of controlling a gas control solenoid in accordance with aspects of the present invention. The method illustrated in FIG. 2 is suited for use with, for example, blow apart contact start plasma-arc torches. As explained above, with respect to FIG. 1, some prior art blow apart torches require a preset time delay to account for the expected worst case time needed for the contact start elements to come into contact upon the removal of gas (e.g., removal of pre-flow gas). Several factors cause this time delay to vary between torches, including, for example, the age/wear of the parts, the length and size of the gas hose, the type of torch, and operating conditions such as temperature. Advantageously, the method illustrated in FIG. 2 eliminates a need for such a preset time delay. Rather, the method of FIG. 2 provides for more accurate and reliable operations.

At block 202, main torch power is turned on and gas pressure is available. As is typical in the art, a torch activation switch (e.g., a trigger switch in the torch handle to be actuated by the torch user) is used to render the torch operational. At block 204, the torch activation switch is actuated and, thereafter, at block 206, a gas control solenoid is opened to allow gas from the gas supply to flow into the torch head assembly. This is referred to as pre-flow gas. With a blow apart torch, the presence of such pre-flow gas should cause the contact start elements to separate, as illustrated at block 208. If such capability is desired, other logic (discussed in greater detail herein) may be used to determine whether the contact start elements in fact separated. At block 210, the gas control solenoid is closed, thereby removing the supply of flowing gas. With the gas removed, the contact start elements should make electrical contact, as shown at block 212. This is expected because, as explained above, in a typical blow apart torch, the contact start elements are biased into electrical contact; air pressure is used to overcome the bias and separate the elements. At block 214, control logic senses whether the contact start elements have, in fact, made contact. This can be accomplished, for example, by monitoring a differential voltage between the contact start elements. By way of further example, if the electrode and tip serve as the contact start elements, a relatively low differential voltage should appear between the electrode and tip when the elements are in electrical contact. This may be referred to as a short circuit, electrode-tip voltage even though the value may have a magnitude in excess of 0 VDC.

In the alternative, the method of the invention could monitor the output voltage of the torch system power supply for an indication of whether the contact start elements have made contact. There are differences between monitoring the differential electrode-tip voltage (Ve-t) and the output voltage (Vout). For example, in torch systems employing a pilot switch to selectively connect the tip into an electrical circuit with the electrode, there will be times when Ve-t is a completely open circuit while Vout is a lower magnitude voltage. Similarly, the presence of a pilot resistor in the path between the tip and ground reference can result in differences between the values of Ve-t and Vout. There are other differences between monitoring Ve-t and Vout (as those terms are generally used herein) which include timing differences associated with establishing settled values and the presence of other circuitry and functionality used for other purposes in a particular torch or torch system.

If the control logic determines that the contact start elements are in contact, a signal is provided at block 216 to open the gas control solenoid. This allows gas to flow into the torch head. The gas pressure should cause the contact start elements to again separate (block 218). As is known in the art, when the elements separate, the high voltage potential between the elements creates a spark and causes the flowing gas to ionize and produce a pilot arc.

Block 220 illustrates that, in many cutting operations, the pilot arc is transferred to a workpiece. Block 222 shows that if the torch operator releases the torch switch, post flow gas is allowed to flow for a brief period but power is removed from the torch head (block 224). If the operator re-actuates the torch switch (block 226), the gas solenoid is again turned off to allow the contact start process to begin anew.

Figure 3:
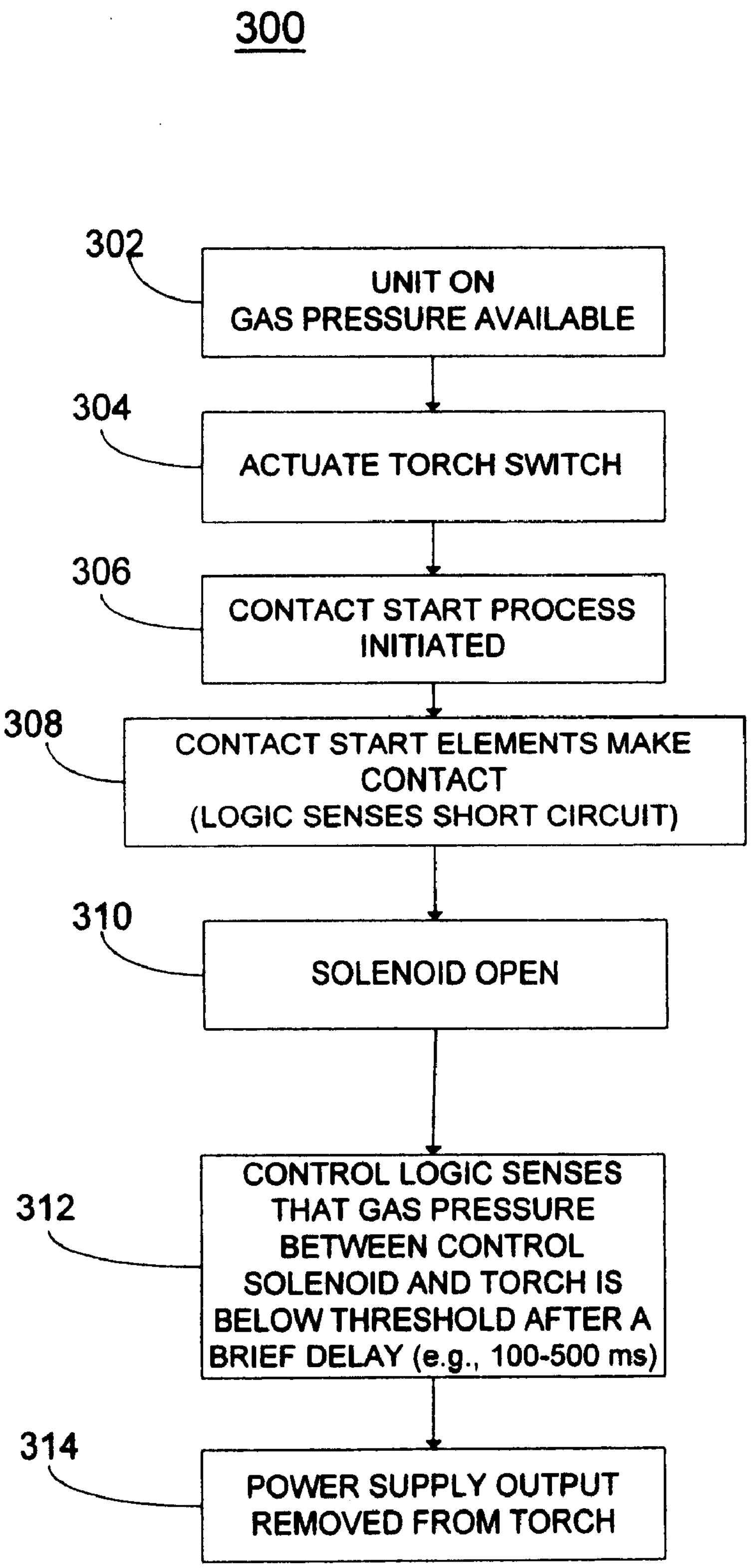
FIG. 3 is a flow chart of a method of operating a contact start plasma-arc torch that detects when there may be insufficient gas pressure to separate the contact start elements.

FIG. 3 is a flow chart that illustrates a method of operating a contact start torch, in accordance with aspects of the present invention. More particularly, FIG. 3 illustrates a method 300 of detecting when the contact start elements do not properly separate as expected. In such case, the power is removed from the torch. At block 302, main torch power is on and gas pressure is available. At block 304, a torch operator actuates the torch switch to begin torch operations. At block 306, a contact start process is initiated. This contact start process is preferably substantially similar to the contact start process illustrated in FIG. 2 (e.g., pre-flow gas, if present, is removed to allow the starting elements to make electrical contact). At block 308, the contact start elements are in electrical contact. Control logic may be employed to ensure sufficient electrical contact between the elements. For example, a differential amplifier, a comparator, or a circuit providing suitable similar functionality can detect a relatively low differential voltage between the elements, indicating continuity therebetween. As a further example, if the electrode and tip comprise the contact start elements, although the full output of the power supply is provided to the electrode, the low impedance path between the electrode and the tip results in a low differential voltage between these elements. A pilot resistor, preferably located between the tip and positive ground, may be used to limit current. It should also be noted that continuity can be detected by monitoring the output voltage rather than the differential voltage between the tip and electrode. It should further be noted that a continuity check at block 308 is not necessarily required in this embodiment; such a test is preferred, as discussed with respect to FIG. 2 above. A simplified method could rely on biasing forces alone to ensure that the contact start elements make contact upon removal of gas flow and then turn gas back on after a brief time delay.

At block 310, the gas solenoid is opened to allow flowing gas to separate the contact start elements and strike a pilot arc. At block 312, control logic determines whether sufficient gas pressure exists to blow the contact start elements apart. Preferably, this control logic includes a delay (e.g., 100–500 ms) to allow the requisite gas pressure to build up. Thus, after the gas control solenoid is turned on, the control logic waits a brief period. If, after that brief period, the gas pressure is below a threshold value needed to separate the contact start elements, the power supply output is removed from the torch at block 314.

As will be explained in greater detail below, one preferred way of implementing the gas pressure check of block 312 is to use a gas pressure switch to sense gas pressure at a point between the solenoid and the torch head. Pressure switches, if used at all in the prior art, are typically located between the gas solenoid and the gas supply. There are several distinct advantages of using a pressure sensing process such as that depicted in FIG. 3. One of the typical reasons that contact start elements fail to separate is a lack of sufficient gas pressure to cause separation. There can be a variety of reasons for a lack of gas pressure. Advantageously, and unlike the prior art, locating a pressure switch between the solenoid and torch head (as opposed to locating it between the gas supply and the solenoid) detects a solenoid failure (e.g., the solenoid fails to open fully or opens only partially). It is believed that the prior art systems are unable to provide such failure detection.

Figure 4:
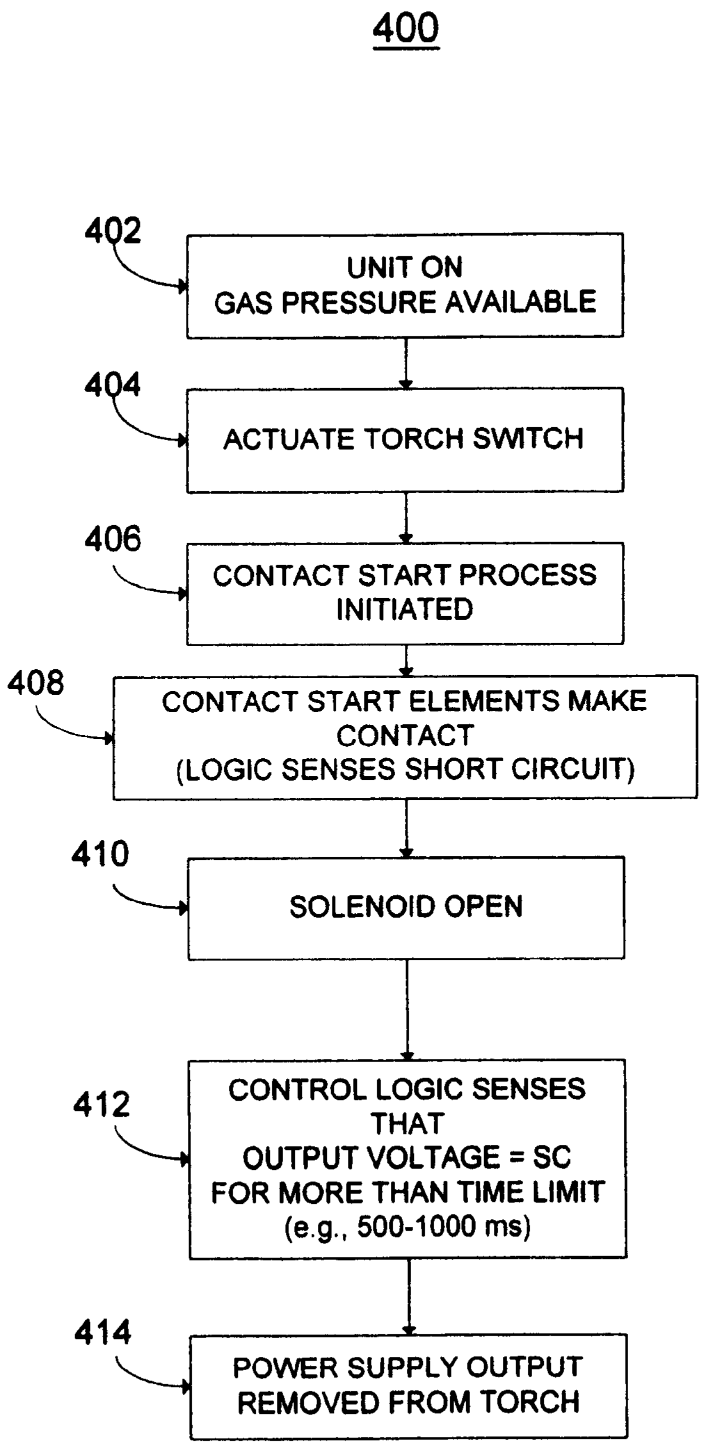
FIG. 4 is a flow chart of a method of operating a contact start plasma-arc torch that detects when the contact start elements fail to separate as expected.

FIG. 4 illustrates a method 400 that reflects an alternative and/or addition to the method 300 illustrated and described with regard to FIG. 3. It should be understood that the methods illustrated herein (including methods 200, 300, and 400) are not mutually exclusive and may be selectively combined to provide enhanced functionality. Blocks 402–410 and 414 preferably provide the same functionality as blocks 302–310 and 314 of FIG. 3, respectively. Block 412 illustrates a primary difference between methods 300 and 400. Rather than (or in addition to) using pressure sensing to detect a likelihood that the elements will not separate, method 400 monitors a voltage indicative of whether the elements remain in continuity. For example, after the gas solenoid is turned on (block 410), the control logic delays for a short period (e.g., 500–1000 ms) to allow the parts to separate. After that delay, the control logic compares the differential voltage between the electrode and tip to a low voltage threshold to determine if a short circuit still remains. If a short circuit remains, the elements have not separated and power is removed (block 414).

Figure 5:
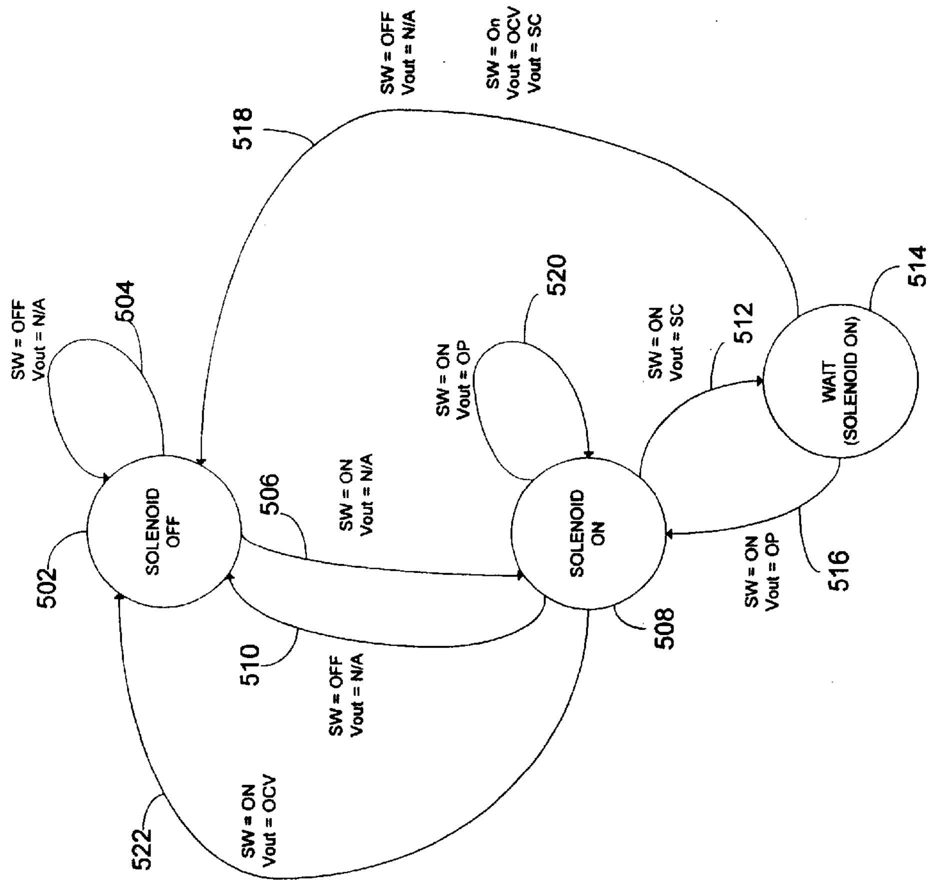
FIG. 5 is a state transition diagram that illustrates a method of controlling a gas solenoid in a blow apart, contact start torch.

FIG. 5 is a state transition diagram that illustrates one preferred method of operating a blow apart, contact start torch in accordance with aspects of the present invention. In particular, FIG. 5 illustrates a method of controlling a gas solenoid by monitoring the status of the torch activation switch and a voltage. The monitored voltage is preferably the output voltage of the power supply, but other voltages can be monitored (e.g., a differential voltage between contact start elements such as an electrode and a tip). It should be understood that the output of a typical power supply for a plasma-arc torch system is substantial. Thus, it is normally desirable to use voltage dividers or other means that provide an indication of the output voltage.

As used in FIG. 5, the variable "SW" refers to the torch activation switch state and is illustrated as having two values—ON and OFF. The variable "Vout" refers to the output voltage of the power supply. For purposes of illustration and understanding, Vout is shown as having three values—OCV (open circuit voltage); SC (short circuit voltage); and OP (operating voltage). Of course, there are other possible values for the output voltage of a power supply used in a plasma-arc torch system. Such values include, for example, no voltage. It should also be understood that plasma-arc torch power supplies normally operate with a positive reference/return. In other words, the positive output terminal of the power supply is tied to ground and the negative output terminal is selectively connected to the electrode. For simplicity, voltages are generally referred to herein in terms of their respective magnitudes. As used in FIG. 5, OCV refers to a relatively high voltage condition which would occur, for example, when the power supply is on but relatively little or no current is flowing. OCV can be, for example, 200 or 300 VDC or more. As used in FIG. 5, SC refers to a relatively low voltage condition which would occur when the contact start elements are in electrical contact (i.e., a low impedance path between the electrode and the positive reference). SC may be below 10 VDC, for example. As used in FIG. 5, OP refers to an operating voltage condition between OCV and SC which would typically occur when an arc is present. The values of OCV, SC, and OP depend upon torch type, and exact values are not generally required to understand the aspects of the invention identified and illustrated herein.

In a first state 502, the gas solenoid is off. This may be the case if the torch switch is not actuated, or for other reasons which are explained herein or are understood in the art. If the gas solenoid is off and torch switch state SW is OFF, the solenoid remains off, regardless of the value of Vout, as shown by line 504 (i.e., Vout is not applicable in such case). On the other hand, if the gas solenoid is currently off and torch switch state SW transitions to ON, as shown by line 506, the solenoid is turned on (state 508), regardless of the value of Vout. For example, when the torch switch is turned on, pre-flow gas may be supplied (see FIG. 2 above).

If the solenoid is on and the operator releases the torch switch, torch switch state SW is OFF and the solenoid is turned off (line 510), regardless of the value of Vout. When the solenoid is on and torch switch state SW remains ON and Vout is SC (indicating a short circuit), the system proceeds along line 512 and enters a short wait state (state 514), leaving the solenoid on. This wait state 514 corresponds to the time needed to allow the contact start elements to separate (i.e., to allow Vout to transition from SC to OP). If, upon completion of the wait state, Vout is OP (indicating that an arc has been established), the solenoid remains on as shown by line 516. If, however, upon completion of the wait state Vout is SC (indicating the contact start elements remain in contact) or OCV (indicating that although the parts are no longer in contact, no arc was struck), the solenoid is turned off, as shown by line 518.

So long as the torch switch is on (SW=ON), and the output voltage indicates an arc (Vout=OP), the solenoid remains on, as shown by line 520. If, however, the arc is lost, the output voltage will transition to a high level (Vout=OCV) and the solenoid is turned off, as shown by line 522.

State diagram 500 also illustrates how a system operating according to that diagram accounts for the contact start elements failing to make sufficient contact to strike an arc. With the solenoid off, when the operator depresses the torch switch (SW=ON), the system follows line 506 and turns on the solenoid. Recall that the contact start elements are normally biased into contact. Thus, when power is applied and gas is turned on, an arc should be struck when gas pressure builds up. This is illustrated by traversing lines 506, 512, and 516. If the output voltage is high after the airflow begins (Vout=OCV), however, the parts never made contact or no arc was struck and the system proceeds along line 522 to turn off the solenoid. Thus, so long as the operator holds the switch down and the parts fail to make contact, the solenoid will cycle on and off (e.g., along lines 506 and 522), giving an indication of a contact start failure.

Figure 6:
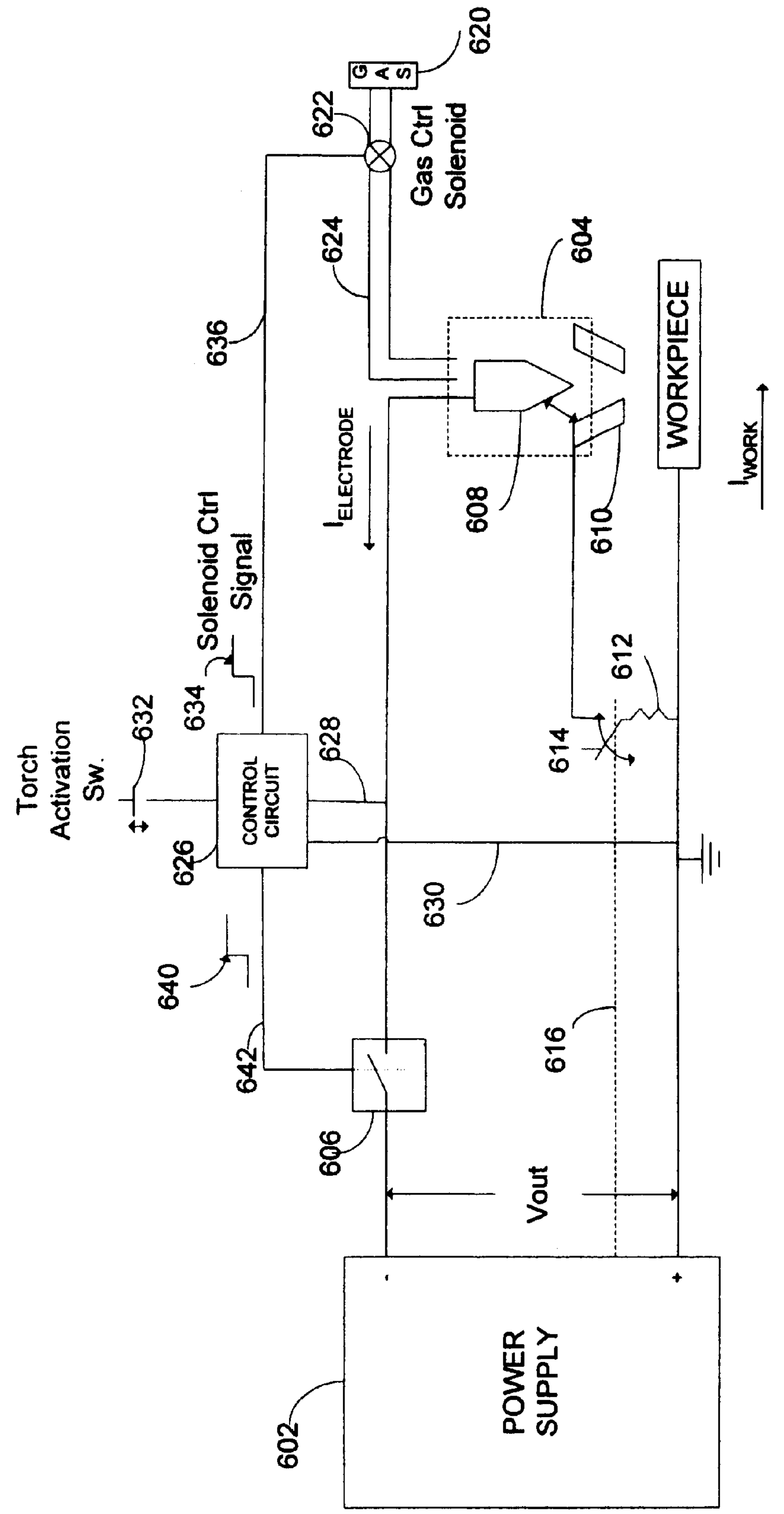
FIG. 6 is a block diagram of a contact start torch system suitable for use in implementing the method of controlling a gas solenoid of FIG. 2.

FIG. 6 is a block diagram of a contact start plasma-arc torch system 600 embodying aspects of the present invention. The system 600 illustrated in FIG. 6 is suitable for implementing the method of controlling the gas solenoid illustrated and described with respect to FIG. 2, and may also be adapted for use with a system operating in accordance with the state diagram illustrated and described with respect to FIG. 5.

FIG. 6 illustrates a positive reference power supply 602 having two output terminals—a positive terminal connected to ground, and a negative terminal that is selectively connected to a torch head 604. A power control switch 606 is illustrated to show that the power supply 602 may be cut off from the torch head 604. More specifically, the negative terminal of power supply 602 is selectively connected to an electrode 608. The positive terminal of power supply 602 is selectively connected to a torch tip 610, via a pilot resistor 612 and a pilot switch 614. Power supply 602 controls the operation of the pilot switch 614 by a pilot switch control signal on line 616. It should be appreciated that the power control switch 606 is shown as being in-line with the negative terminal for illustrative purposes only and could preferably be within the power supply or elsewhere (e.g., one or more power control switches, relays, contactors, or the like).

In the embodiment illustrated in FIG. 6, the torch comprises a blow apart torch and the electrode 608 and the tip 610 comprise the contact start elements. Electrode 608 and tip 610 are normally biased into contact. The presence of flowing gas of sufficient pressure overcomes the bias and separates electrode 608 and tip 610.

A supply of gas 620 is selectively connected to torch head 604 via a gas control solenoid 622 and a gas supply line 624. A control circuit 626 monitors the output voltage (Vout) of power supply 602 via lines 628 and 630. The control circuit 626 also monitors the state of a torch activation switch 632. Control circuit 626 provides a solenoid control signal 634 on a line 636 to the gas control solenoid 622. Control circuit 626 also provides a power control signal 640 to power control switch 606. In a preferred embodiment, control circuit 626 is located within the power supply; it is illustrated external to facilitate a detailed explanation of the system.

In operation, when an operator first depresses torch activation switch 632, control circuit 636 causes gas control solenoid 622 to open (via solenoid control signal 634), thereby allowing pre-flow gas to flow from gas supply 620 into torch head 604 to separate electrode 608 and tip 610 (see also FIG. 2 above). Thereafter, control circuit 636 closes gas control solenoid 622, which removes the pre-flow and allows electrode 608 and tip 610 to make contact. At this point, the pilot switch 614 should be closed so that tip 610 is connected to the positive return of power supply 602 (preferably via optional pilot resistor 612), and power supply output Vout is applied to electrode 608.

Control circuit 626 monitors a voltage to determine when electrode 608 and tip 610 are in contact. As illustrated in FIG. 6, control circuit 626 monitors Vout to make this determination. If Vout is below a low voltage threshold, control circuit 626 determines that electrode 608 and tip 610 have made contact and thereafter opens gas solenoid 622 (if contact is detected). With solenoid 622 open, gas again flows into torch head 604. If the torch is operating as expected, the flow of gas causes electrode 608 and tip 610 to separate. As separation occurs, the voltage potential between electrode 608 and tip 610 causes a spark and ionizes the flowing gas, thereby creating an arc. If, on the other hand, control circuit 626 senses a high voltage (e.g., open circuit condition between electrode 608 and tip 610) rather than the expected low voltage condition, it turns off the gas solenoid. As mentioned above, it should be understood, with the benefit of the present disclosure, that control circuit 626 could also be configured to monitor a differential voltage Ve-t established between the electrode and tip to determine when electrode 608 and tip 610 are in electrical contact. There are, however, differences between Ve-t and Vout which must be considered.

Figure 7:
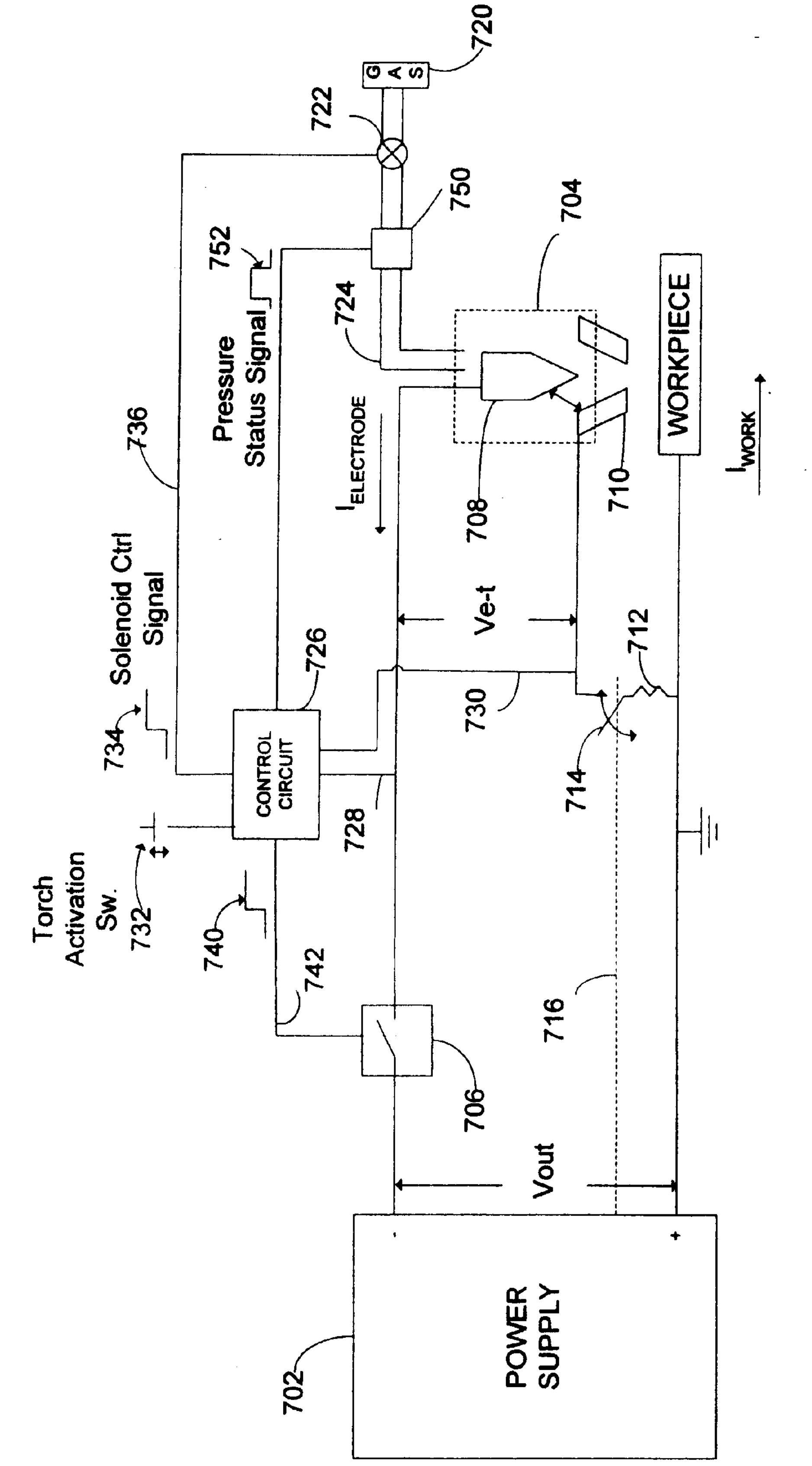
FIG. 7 is a block diagram of a contact start torch system suitable for use in implementing the methods of FIGS. 3 and 4.

FIG. 7 is a block diagram of a contact start plasma-arc torch system 700 embodying aspects of the present invention. The system 700 illustrated in FIG. 7 is preferably substantially similar to system 600 of FIG. 6. A primary difference between the systems 600 and 700 is the addition of a pressure switch and monitoring of a differential voltage between the electrode and the tip. With the benefit of the present disclosure, the systems of FIGS. 6 and 7 could be combined. System 700 is suitable for implementing the methods illustrated in FIGS. 3 and 4.

FIG. 7 illustrates a positive reference power supply 702 having two output terminals—a positive terminal connected to ground, and a negative terminal that is selectively connected to a torch head 704. A power control switch 706 is illustrated to show that the power supply 702 may be cut off from the torch head 704. More specifically, the negative terminal of power supply 702 is selectively connected to an electrode 708. The positive terminal of power supply 702 is selectively connected to a torch tip 710, via a pilot resistor 712 and a pilot switch 714. Power supply 702 controls the operation of the pilot switch 714 by a pilot switch control signal on line 716. It should be appreciated that the power control switch 706 is shown as being in-line with the negative terminal for illustrative purposes only and could preferably be within the power supply or elsewhere (e.g., one or more power control switches, relays, contactors, or the like).

In the embodiment illustrated in FIG. 7, the torch comprises a blow apart torch and the electrode 708 and the tip 710 comprise the contact start elements. Electrode 708 and tip 710 are normally biased into contact. The presence of flowing gas of sufficient pressure overcomes the bias and separates electrode 708 and tip 710.

A supply of gas 720 is selectively connected to torch head 704 via a gas control solenoid 722 and a gas supply line 724. A control circuit 726 monitors a differential voltage developed between electrode 708 and tip 710 (Ve-t) via lines 728 and 730. The control circuit 726 also monitors the state of a torch activation switch 732. Control circuit 726 provides a solenoid control signal 734 on a line 736 to open and close the gas control solenoid 722. Control circuit 726 also provides a power control signal 740 to power control switch 706. In a preferred embodiment, control circuit 726 is located within the power supply. It is illustrated external to facilitate a detailed explanation of system 700.

A pressure switch 750 is preferably located such that it senses a pressure in the gas line 724 at a point between gas control solenoid 722 and torch head 704. Several of the advantages of sensing pressure at such a location are described above. The pressure switch 750 preferably provides a pressure status signal 752 to control circuit 726 via a line 754. The pressure status signal 752 has a parameter indicative of a pressure in gas line 724. It should be appreciated that pressure switch 750 can provide a simple binary signal (e.g., on/off) having a first value if the sensed pressure is less than a low pressure threshold and a second value if the sensed pressure exceeds the threshold. More complicated switches and pressure sensing techniques are also possible. For example, a pressure switch could provide an analog or digital signal having a parameter indicative of a relative gas pressure within the gas supply line.

In operation, when an operator first depresses torch activation switch 732, control circuit 736 causes gas control solenoid 722 to open (via solenoid control signal 734) and provide pre-flow gas, thereby allowing gas to flow from gas supply 720 into torch head 704 to separate electrode 708 and tip 710. Thereafter, control circuit 736 closes gas control solenoid 722, which removes the flow of gas and allows electrode 708 and tip 710 to make contact. At this point, the pilot switch 714 should be closed so that tip 710 is connected to the positive return of power supply 702 (preferably via optional pilot resistor 712), and the power supply output is applied to electrode 708.

Control circuit 726 monitors a voltage to determine when electrode 708 and tip 710 are in contact. Preferably, as illustrated in FIG. 7, control circuit 726 monitors Ve-t to make this determination. If Ve-t is below a low voltage threshold (e.g., 6.2 VDC), control circuit 726 determines that electrode 708 and tip 710 have made contact and thereafter opens gas solenoid 722. With solenoid 722 open, gas again flows into torch head 704. If the torch is operating as expected, the flow of gas causes electrode 708 and tip 710 to separate and create a pilot arc. If an arc exists, Ve-t will be substantially higher than the low voltage threshold.

Advantageously, control circuit 726 can cut off power in the event that electrode 708 and tip 710 remain in electrical contact for a time period after solenoid 722 has been turned on and gas is expected to be flowing. A first way of accomplishing this shut down function is to monitor pressure status signal 752 from pressure switch 750. If the reason that electrode 708 and tip 710 remain in contact is an insufficient supply of gas pressure, pressure switch 750 provides an indication to control circuit 726. If sufficient time has passed since gas control solenoid 722 was turned on (e.g., 100–500 ms), control circuit 726 cuts off power to the torch (e.g., power control signal 740 causes power control switch 706 to remove power from the torch head). Preferably, control circuit 726 also turns off gas control solenoid 722 at this time.

A second way of accomplishing the shut down function is by monitoring Ve-t. If sufficient time has passed since gas control solenoid 722 was turned on (e.g., 500–1000 ms), and Ve-t remains below a low voltage threshold, control circuit 726 cuts off power to the torch (e.g., power control signal 740 causes power control switch 706 to remove power from the torch head). Preferably, control circuit 726 also turns off gas control solenoid 722 at this time.

Figure 8:
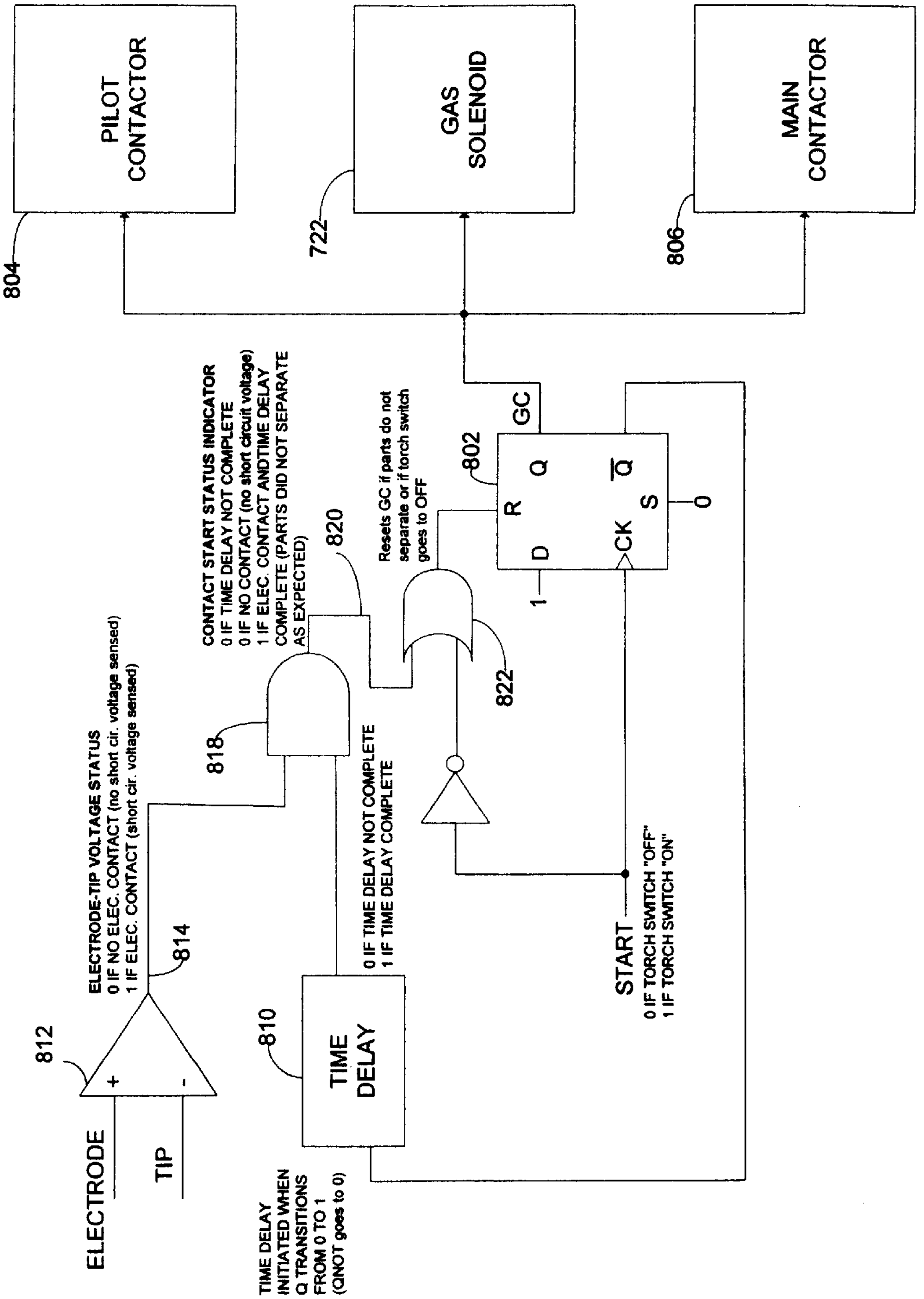
FIG. 8 is a logic diagram that illustrates particular aspects of preferred control circuitry suitable for use in the system of FIG. 7.

FIG. 8 is a logic diagram that illustrates pertinent aspects of a preferred embodiment of control circuit 726. The output "Q" of a D-type flip-flop 802 is used to control a pilot contactor switch 804, a gas control solenoid (e.g., solenoid 722), and a main contactor switch 806. The output Q is referred to as a gas control signal or simply GC herein. The data input "D" of the flip-flop 802 is tied to a logic 1. The clock input "CK" receives a START signal, which is indicative of the status of the torch activation switch 732. The set input "S" is tied to a logic 0. The reset input "R" is connected to additional logic that will be described below. The inverted output (Qnot) is connected to a time delay circuit 810.

As shown in FIG. 8, Ve-t is sensed by a comparator 812. The output 814 of the comparator 812 provides an indication of the status of Ve-t. Output 814 of comparator 812 is logically ANDed with a time delay status signal supplied on the output 816 of time delay circuit 810. This AND operation is illustrated in FIG. 8 by AND gate 818. The output 820 of this AND operation comprises a contact start status signal which is supplied as a first input to an OR operation illustrated in FIG. 8 by OR gate 822. The other input of the OR operation is an inverted version of the START signal referenced above.

When the torch is activated (i.e., the operator presses the torch activation switch), the START signal rises from a logic 0 to a logic 1. This rising edge on the START signal clocks flip-flop 802. Because the data input "D" of flip-flop 802 is tied to a logic 1, the clock signal causes the 1 to appear at the flip-flop output Q. Thus, gas control signal GC is asserted, turning on the pilot contactor 804, gas control solenoid 722, and the main contactor 806. At this point, therefore, power is applied and a short circuit should exist between the contact start elements. When gas pressure builds up, the contact start elements should separate.

The comparator 812 monitors the differential electrode-tip voltage Ve-t. If Ve-t is less than a low voltage threshold (e.g., 6.2 VDC), indicating a short circuit condition between the contact start elements, output 814 of comparator 812 is a logic 1. If Ve-t is not less than the low voltage threshold, the output 814 is a logic 0, indicating that no short circuit condition is sensed. Output 814 of comparator 812 is logically ANDed with the output 816 of time delay circuit 810 to provide the contact start status signal. The time delay accounts for the expected amount of time it should take for the contact start elements to separate (e.g., 500–1000 ms). Time delay circuit 810 outputs a logic 1 if the delay period has completed and a logic 0 otherwise. The AND operation (818) ensures that the contact start status signal is a logic 1 only when the time delay is complete and comparator 812 senses electrical continuity between the contact start elements. Consequently, the contact start status signal is a logic 0 if there is no contact between the elements or the time delay has not been satisfied. Stated differently, the contact start status signal is a logic 1 if the parts failed to separate as expected within the time delay period.

The reset input "R" of flip-flop 802 is used to cut off power and turn off the gas when the contact start elements fail to properly separate or if the START signal is removed. Thus, if a logic 1 appears on either input of the AND operator 822, flip-flop 802 is reset, causing GC (output Q) to a logic 0 which turns off pilot contractor 804, gas solenoid 722, and main contactor 806. Another clock signal (START transitions from logic 0 to 1) is required before GC is again a logic 1. Accordingly, if the time delay has completed and comparator 812 indicates a short circuit between the contact start elements, a logic 1 at the input of OR operator 822 resets flip-flop 802. Otherwise, power and airflow remain on and torch operations continue.

It should be appreciated that other circuitry and logic herein described could be combined with the capabilities illustrated and described with respect to FIG. 8.

Figure 9A:
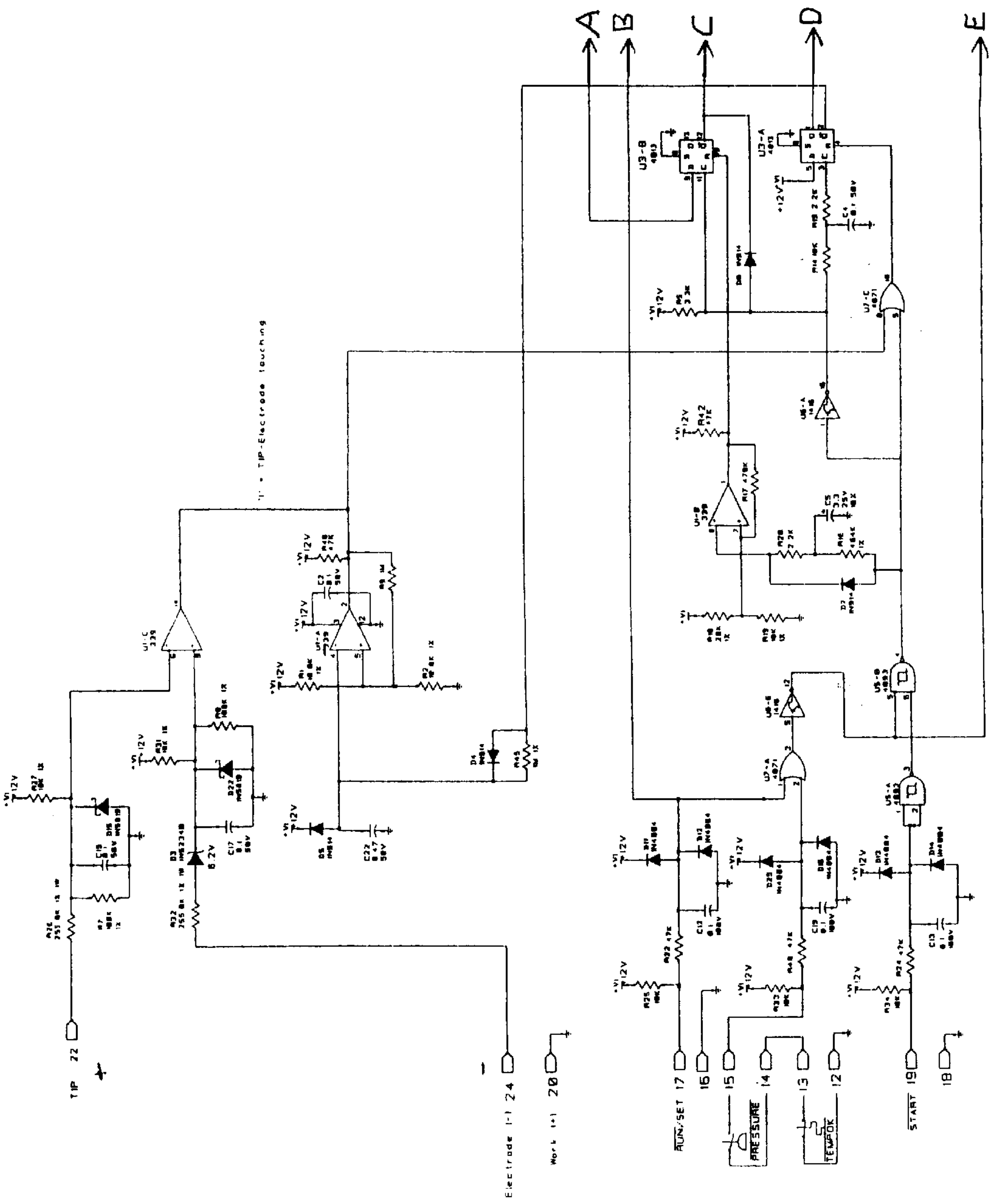
FIGS. 9A and 9B provide a detailed schematic of a preferred configuration of the control circuitry of FIG. 8.
Figure 9B:
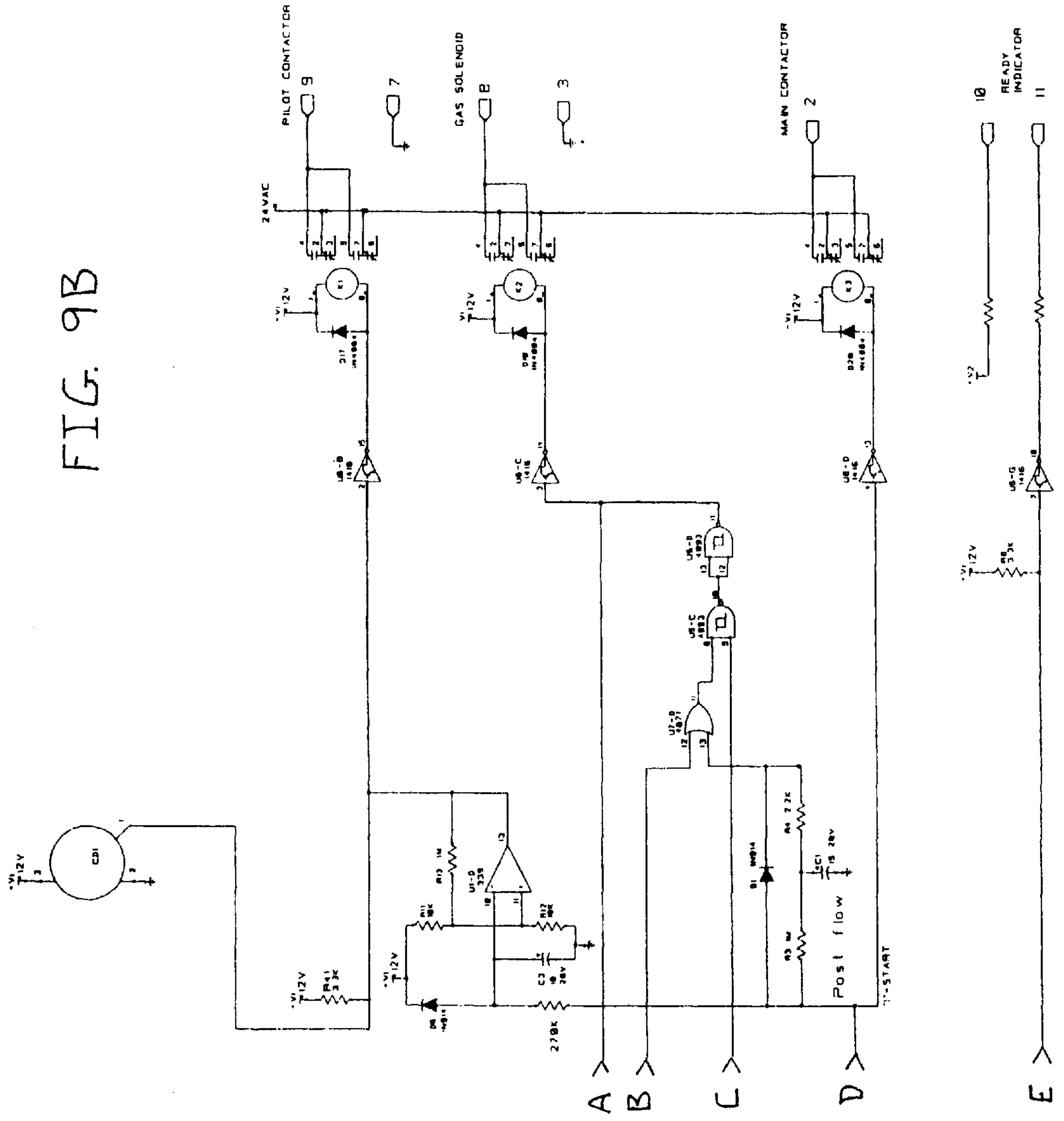

FIGS. 9A and 9B provide a detailed schematic, illustrating one set of preferred circuitry for implementing the control functionality of FIG. 8. The voltage on the tip (PCB connector pin 22) and electrode (PCB connector pin 24) can have a high magnitude (e.g., 300–400 volts) which cannot be measured directly by a standard comparator. Consequently, the voltage is divided down and level shifted from negative to positive by the dividers comprising R26 and R27 (tip) and R32, D3, and R31. The divided down tip voltage is applied to the negative comparator input (U1-C pin 8) and the divided down electrode voltage is applied to the positive comparator input (U1-C pin 9). When the tip voltage is less than 6.2 volts from the electrode voltage, as determined by the zener voltage of zener diode D3 (note that other values could be used, the present being exemplary only), the voltage on the positive input (U1-C pin 9) is positive relative to the voltage on the negative input (U1-C pin 8), causing the output of the comparator (U1-C pin 14) to be high.

To start a pilot arc, a low level start signal is applied to the connector pin 19. This low level signal passes through U5-A, U5-B and U6-A to a flip-flop (U3-A) clock input (pin 3), setting the flip-flop to a logic high on its output (U3-A pin 1). This turns on relay K3 and the main contactor to supply DC power to the torch. It should be understood that instead of a relay, a logic level signal could be used to enable an inverter power supply. The high on U3-A pin 1 also passes through Dl, U7-D, U5-C, U5-D, and U6-C to turn on the gas solenoid.

At the time the start signal is applied, the tip and the electrode should be in contact and the voltage between them should be less than the zener voltage of zener diode D3 (e.g., less than 6.2 volts) so that the output of the comparator (U1-C) is high. The high output, after passing through U7-C to U3-A pin 4, (the flip-flip's reset pin), would hold the flip-flop reset and prevent a start. However, the output (pin 2) of comparator U1-A is configured as a time delay. The output of the time delay is initially low, holding pin 14 low as well. Thus, U3-A can be set to start the pilot.

At the same time that pin 1 of U3-A goes high, pin 2 of U3-A goes low, discharging capacitor C22 (which was initially charged to the +12 volt logic supply) through resistor R45. In approximately 500 ms (those skilled in the art will appreciate that the time constant providing the delay can be varied across a wide range, depending upon needs) capacitor C22, which is connected to U1-A pin 4, is discharged below the voltage on pin 5 of U1-A, causing the output of U1-A to go high. If at the end of the 500 ms the torch parts have separated (as expected), the output of U1-C will have gone low, keeping the reset signal low. If, however, the tip and electrode remain in contact after the 500 ms delay period, a high on both U1-A and U1-C's outputs will, through U7-C, reset the flip-flop and shut off the K3 relay (or logic signal) and remove power from the torch.

Although several of the embodiments illustrated herein have been described in terms of contact starting using an electrode and a tip that are biased into contact for starting purposes, other arrangements are possible. For example, contact starting can be achieved by causing a condition that allows a closed electrical circuit to be established between two or more contact start elements. By way of further example, one or more of these contact start elements can be made movable for causing the closed electrical circuit to be established and/or terminated, as needed. Further, one or more of these elements can be monitored for voltage sensing, such as sensing a voltage established between two or more contact start elements.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense. It is further to be understood that the steps described herein are not to be construed as necessarily requiring their performance in the particular order discussed or illustrated. It is also to be understood that additional or alternative steps may be employed with the present invention.

What is claimed is:

1. A method of operating a contact-start plasma arc torch system, said torch system including a torch activation switch indicating desired operational states of the torch, a power supply having first and second output terminals and selectively supplying an output voltage therebetween, a plurality of contact start elements, a first one of the plurality of contact start elements being in selective electrical communication with the first output terminal, and a second one of the plurality of contact start elements being in selective electrical communication with the second output terminal, said method comprising:

monitoring the torch activation switch and determining if the desired operational state of the torch transitions from an off state to an operating state;

causing a condition allowing a closed electrical circuit to be established between the plurality of contact start elements;

sensing a closed electrical circuit condition between the plurality of contact start elements;

opening a gas control switch and providing a flowing gas to be ionized upon sensing the closed electrical circuit condition between the plurality of contact start elements;

sensing an open electrical circuit condition between the plurality of contact start elements after opening the gas control switch; and closing the gas control switch and removing the flowing gas if the open electrical circuit condition is sensed between the plurality of contact start elements after the flowing gas has been provided.

2. The method of claim 1 further comprising:

closing the gas control switch and removing the flowing gas when the torch actuation switch indicates that the desired operational state of the torch is the off state.

3. A method of operating a contact-start plasma arc torch system, said torch system including a torch actuation switch indicating desired operational states of the torch, a power supply having first and second output terminals and selectively supplying an output voltage therebetween, a plurality of contact start elements, a first one of the plurality of contact start elements being in selective electrical communication with the first output terminal, and a second one of the plurality of contact start elements being in selective electrical communication with the second output terminal, said method comprising:

monitoring the torch activation switch and determining if the desired operational state of the torch transitions from an off state to an operating state;

closing a gas control switch to allow the plurality of contact start elements to form a closed electrical circuit between said plurality of contact start elements;

monitoring the output voltage;

comparing the output voltage to a low voltage threshold;

opening the gas control switch and providing a flowing gas to be ionized if the output voltage is less than the low voltage threshold; and comparing the output voltage to a high voltage threshold after opening the gas control switch and thereafter closing the gas control switch and removing the flowing gas if the output voltage is greater than the high voltage threshold.

4. The method of claim 3 further comprising:

closing the gas control switch and removing the flowing gas when the torch actuation switch indicates that the desired operating state of the torch is the off state.

5. A method of operating a contact-start plasma arc torch system, said torch system including a torch activation switch having a first state and a second state, a power supply responsive to the state of the torch actuation switch and selectively providing an output voltage, a solenoid selectively allowing a gas to be ionized to flow into the torch, the method comprising:

determining the state of the torch actuation switch;

determining a value indicative of the output voltage;

determining the position of the solenoid;

opening the solenoid if the torch actuation switch is in the second state and the solenoid is closed; and closing the solenoid if the torch actuation switch is in the second state and the solenoid is open and the output voltage is greater than an open circuit threshold.

6. The method of claim 5 further comprising maintaining the solenoid in the open state if the solenoid is already open and the output voltage is less than the open circuit threshold and greater than a short circuit threshold.

7. The method of claim 5 further comprising closing the solenoid if the torch actuation switch transitions from the second state to the first state.

8. The method of claim 5 further comprising:

holding the solenoid in the open state for a contact start time period if the solenoid is already in the open state, the torch actuation switch is on and the output voltage is less than a short circuit threshold; and closing the solenoid if after the contact start time period expires the output voltage remains less than the short circuit threshold.

9. The method of claim 8 further comprising closing the solenoid if after the contact start time period expires the output voltage is greater than the open circuit threshold.

10. The method of claim 8 further comprising maintaining the solenoid in the open state if after the contact start time period expires the output voltage is greater than the short circuit threshold and less than the open circuit threshold.

11. A contact start plasma-arc torch system for use by a torch operator in connection with a workpiece, the torch system comprising:

a power source selectively providing an output voltage, and wherein said output voltage transitions from a first value to a second value when a contact start operation is initiated;

a torch head including an electrode and a tip, said electrode positioned in a circuit path with the power source and receiving the output voltage, said tip being adjacent the electrode;

a source of gas to be ionized;

a gas supply line;

a gas control solenoid associated with the gas supply line, said gas control solenoid being positioned between the source of gas and the torch head and selectively allowing gas from the source of gas to flow into the torch head via the gas supply line;

a gas monitor circuit providing a gas pressure signal having a parameter indicative of a gas pressure in the gas supply line at a point between the gas control solenoid and the torch head; and a control circuit monitoring the output voltage and the gas pressure signal, said control circuit setting a time delay period when the output voltage transitions from the first value to the second value and causing the output voltage to reset from the second value to a third value if after the time delay period the gas pressure signal is less than a gas threshold.

12. The torch system of claim 11 wherein the control circuit monitors a differential voltage between the electrode and the tip, said control circuit causing the output voltage to reset from the second value to the third value if the differential voltage between the electrode and the tip is less than a contact start voltage threshold after a time period sufficient to allow the contact start operation to complete has elapsed.

13. The torch system of claim 11 wherein the control circuit sets another time delay period when the output voltage transitions from the first value to the second value, said control circuit monitoring a differential voltage between the electrode and the tip and causing the output voltage to reset from the second value to the third value if the differential voltage between the electrode and the tip is less than a short circuit threshold after the another time delay period has elapsed.

14. The torch system of claim 13 wherein the time delay period is between 100 milliseconds and 500 milliseconds and the another time delay period is equal to or greater than the time delay period.

15. The torch system of claim 11 wherein the electrode and tip are positioned in the torch head such that the electrode and tip are biased into contact unless gas from the source of gas is flowing into the torch head.

16. The torch system of claim 11 wherein the control circuit is operable to selectively cause the output voltage to reset from the second value to the third value whereby the output voltage is removed from the electrode when the output voltage is at the third value.

17. The torch system of claim 11 wherein the gas monitor circuit comprises a gas pressure sensor.

18. A contact start plasma-arc torch system for use by a torch operator in connection with a workpiece, the torch system comprising:

a power source selectively providing an output voltage;

a torch head including an electrode and a tip, said electrode positioned in a circuit path with the power source and receiving the output voltage, said tip being adjacent the electrode;

a source of gas to be ionized;

a gas supply line;

a gas control solenoid associated with the gas supply line, said gas control solenoid being positioned between the source of gas and the torch head and selectively allowing gas from the source of gas to flow into the torch head via the gas supply line;

a gas monitor circuit providing a gas pressure signal having a parameter indicative of a gas pressure in the gas supply line at a point between the gas control solenoid and the torch head; and a control circuit monitoring a differential voltage selectively established between the electrode and the tip, said differential voltage transitioning from a first value to a second value when a contact start operation is initiated, said control circuit also monitoring the gas pressure signal, said control circuit setting a time delay period when the differential voltage transitions from the first value to the second value and causing the power source to remove the output voltage from the electrode if after the time delay period the gas pressure signal is less than a gas pressure threshold.

19. The torch system of claim 18 wherein the control circuit sets another time delay period when the differential voltage transitions from the first value to the second value, said control circuit causing the power source to remove the output voltage from the electrode if after the another time delay period the differential voltage is less than a low voltage threshold.

20. The torch system of claim 19 wherein the time delay period is between 100 milliseconds and 500 milliseconds and the another time delay period is equal to or greater than the time delay period.

21. The torch system of claim 18 wherein the gas monitor circuit comprises a gas pressure sensor.

22. A contact start plasma-arc torch for use by a torch operator in connection with a workpiece, the torch system comprising:

a power source selectively providing an output voltage that transitions from a first value to a second value when a contact start operation is initiated by the torch operator;

a torch head including an electrode and a tip, said electrode positioned in a circuit path with the power source and receiving the output voltage, said tip being adjacent the electrode; and a control circuit monitoring a differential voltage between the electrode and the tip, said control circuit causing the output voltage of the power source to transition to a third value if the differential voltage between the electrode and the tip remains less than a contact start threshold after a time period sufficient to allow the contact start operation to complete has elapsed.

23. The torch system of claim 22 wherein the control circuit is operable to selectively cause the output voltage to transition to the third value whereby the output voltage is removed from the electrode when the output voltage is at the third value.

24. A power supply suitable for use in connection with a contact start plasma-arc torch system, said torch system including a torch head, a source of gas to be ionized, a gas supply line supplying gas to the torch head, a gas control switch associated with the gas supply line, said gas control switch being positioned between the source of gas and the torch head and selectively allowing gas from the source of gas to flow into the torch head via the gas supply line, and a gas pressure switch providing a gas pressure signal indicative of a gas pressure in the gas supply line at a point between the gas control solenoid and the torch head, said power supply comprising:

a power source selectively providing an output voltage to the torch head, and wherein said output voltage transitions from a first value to a second value when a contact start operation is initiated; and a control circuit monitoring the output voltage and the gas pressure signal, said control circuit setting a time delay period when the output voltage transitions from the first value to the second value and causing the output voltage to reset from the second value to a third value if after the time delay period the gas pressure signal is less than a gas pressure threshold.

25. The power supply of claim 24 wherein the control circuit monitors a differential voltage between the electrode and the tip, said control circuit causing the output voltage to reset from the second value to the third value if the differential voltage between the electrode and the tip is less than a low voltage threshold after a time period sufficient to allow the contact start operation to complete has elapsed.

26. The power supply of claim 24 wherein the control circuit sets another time delay period when the output voltage transitions from the first value to the second value, said control circuit monitoring a differential voltage between the electrode and the tip and causing the output voltage to reset from the second value to the third value if the differential voltage between the electrode and the tip is less than a short circuit threshold after the another time delay period has elapsed.

27. The power supply of claim 26 wherein the time delay period is between 100 milliseconds and 500 milliseconds and the another time delay period is equal to or greater than the time delay period.

28. The power supply of claim 24 wherein the control circuit is operable to selectively cause the output voltage to reset from the second value to the third value whereby the output voltage is removed from the electrode when the output voltage is at the third value.

29. A power supply suitable for use in connection with a contact start plasma-arc torch system, said torch system including a torch head having an electrode and a tip, a source of gas to be ionized, a gas supply line supplying gas to the torch head, a gas control switch associated with the gas supply line, said gas control switch being positioned between the source of gas and the torch head and selectively allowing gas from the source of gas to flow into the torch head via the gas supply line, and a gas pressure switch providing a gas pressure signal indicative of a gas pressure in the gas supply line at a point between the gas control solenoid and the torch head, said power supply comprising:

a power source selectively providing an output voltage to the electrode, and wherein said output voltage transitions from a first value to a second value when a contact start operation is initiated; and a control circuit monitoring a differential voltage selectively established between the electrode and the tip, said differential voltage transitioning from a first value to a second value when the contact start operation is initiated, said control circuit also monitoring the gas pressure signal, said control circuit setting a time delay period when the differential voltage transitions from the first value to the second value and causing the power source to remove the output voltage from the electrode if after the time delay period the gas pressure signal is less than a gas pressure threshold.

30. The power supply of claim 29 wherein the control circuit sets another time delay period when the differential voltage transitions from the first value to the second value, said control circuit causing the power source to remove the output voltage from the electrode if after the another time delay period the differential voltage is less than a low voltage threshold.

31. The power supply of claim 30 wherein the time delay period is between 100 milliseconds and 500 milliseconds and the another time delay period is equal to or greater than the time delay period.

32. A power supply suitable for use in connection with a contact start plasma-arc torch system, said torch system including a torch head having an electrode and a tip, a source of gas to be ionized, a gas supply line supplying gas to the torch head, and a gas control switch associated with the gas supply line, said gas control switch being positioned between the source of gas and the torch head and selectively allowing gas from the source of gas to flow into the torch head via the gas supply line, said power supply comprising:

a power source selectively providing an output voltage to the electrode, said output voltage transitioning from a first value to a second value when a contact start operation is initiated; and a control circuit monitoring a differential voltage between the electrode and the tip, said control circuit causing the output voltage of the power source to transition to a third value if the differential voltage between the electrode and the tip remains less than a contact start threshold after a time period sufficient to allow the contact start operation to complete has elapsed.

33. The power supply of claim 32 wherein the control circuit is operable to selectively cause the output voltage to transition to the third value whereby the output voltage is removed from the electrode when the output voltage is at the third value.

* * * * *